United States Patent [19]
Taylor

[11] Patent Number: 5,578,808
[45] Date of Patent: Nov. 26, 1996

[54] DATA CARD THAT CAN BE USED FOR TRANSACTIONS INVOLVING SEPARATE CARD ISSUERS

[75] Inventor: Douglas C. Taylor, New York, N.Y.

[73] Assignee: Datamark Services, Inc., New York, N.Y.

[21] Appl. No.: 395,575

[22] Filed: Feb. 28, 1995

Related U.S. Application Data

[63] Continuation-in-part of Ser. No. 172,482, Dec. 22, 1993.

[51] Int. Cl.$^6$ .................................................. G06K 5/00
[52] U.S. Cl. ........................ 235/380; 235/379; 235/492; 235/440; 235/384
[58] Field of Search .................................... 235/379, 380, 235/492, 440, 384

[56] References Cited

U.S. PATENT DOCUMENTS

| | | | |
|---|---|---|---|
| 4,382,279 | 5/1983 | Ugon | 364/200 |
| 4,634,845 | 1/1987 | Hale et al. | 235/380 |
| 4,683,372 | 7/1987 | Matsumoto | 235/492 |
| 4,709,137 | 11/1987 | Yoshida | 235/492 X |
| 4,736,094 | 4/1988 | Yoshida | 235/380 X |
| 4,816,654 | 3/1989 | Anderl et al. | 235/380 |
| 4,874,935 | 10/1989 | Younger | 235/492 |
| 4,882,474 | 11/1989 | Anderl et al. | 235/492 X |
| 5,276,311 | 1/1994 | Hennige | 235/380 |

OTHER PUBLICATIONS

Stephen B. Weinstein, "Smart Credit Cards: The Answer to Cashless Shopping", Feb. 1984, pp. 43–48, IEEE Spectrum.

Primary Examiner—Donald T. Hajec
Assistant Examiner—Michael G. Lee
Attorney, Agent, or Firm—Donald S. Dowden; Cooper & Dunham LLP

[57] ABSTRACT

A multi-application data card is capable of substituting for a plurality of existing single-application data cards. The multi-application data card is preferably a smart card recording data relating to a card user and a plurality of card issuers. The following fields are associated with each card issuer: an application code field indicating a type of application provided for the user by the issuer; a PIN field identifying the user; an access code field whereby the card issuer can have access to the fields associated with that issuer but not to fields associated with any other issuer; an account number field; an expiration date field; and a miscellaneous data field provided for the issuer to record additional data to facilitate its operations. The fields associated with each issuer are separate from the fields associated with every other issuer.

4 Claims, 9 Drawing Sheets

MULTICARD RECORD

CARD RECORD

| CARD | PIN# | ACCT# | EX. DATE | ACCESS CODE | RECORDS | MISC. |
|---|---|---|---|---|---|---|
| AMER. EXP. | | | | | | |
| VISA | | | | | | |
| M/C | | | | | | |
| DISCOV. | | | | | | |
| OIL CO'S | | | | | | |
| HOTEL # | | | | | | |
| AIRLINES # | | | | | | |

TYPICAL APPLICATION RECORD

| CARD ISSUER | APPLICATION CODE | PIN # | VENDOR ACCESS CODE | ACCOUNT # | EXPIRATION DATE | MISC. DATA |
|---|---|---|---|---|---|---|
| AMEX | CREDIT | 3333 | ------ | ------ | 5.96 | |
| ANY STORE | FREQUENCY | 3333 | ------ | ------ | 5.95 | |
| ANY CARD | PREPAID | 3333 | ------ | ------ | ------ | |
| VISA | DEBIT | 3333 | ------ | ------ | 10.95 | |
| VISA | CREDIT | 3333 | ------ | ------ | ------ | |
| ETC | ETC | ETC | ETC | ETC | ETC | |

FIG. 4

DATA CARD THAT CAN BE USED FOR TRANSACTIONS INVOLVING SEPARATE CARD ISSUERS

CROSS REFERENCE TO RELATED APPLICATION

This is a continuation-in-part of a U.S. patent application of Douglas C. Taylor Ser. No. 08/172,482, filed Dec. 22, 1993, for "Multi-Application Data Card."

BACKGROUND OF THE INVENTION

1. Field of the Invention

This invention relates to data cards and, more particularly, to a multi-application data card capable of substituting for a plurality of existing single-application data cards and to a system and method of employing the card.

2. Description of the Prior Art

The generic term "data card" includes not only all kinds of financial cards but also various other cards that contain non-financial data. The term "financial card" includes credit cards, debit cards, A.T.M. cards and other cards that contain financial data. From another standpoint, data cards include, to cite only a few examples, oil company cards, department store cards, car rental cards, hotel cards and airline cards.

Data cards are now ubiquitous; their use has proliferated to such an extent that users of the cards find it objectionable and burdensome to carry all that seem to be required if one is to function in modern society.

Attempts have been made in the past to remedy the problem of card proliferation. For example, certain issuers of "general-purpose" credit cards (e.g., American Express, Visa, Master Charge) have prevailed upon many establishments, including those such as department stores,.oil companies, airlines and car rental companies that issue their own credit cards, to accept the general-purpose credit card in addition to the card separately issued by the department store, oil company, etc. Also, there are co-branded cards. Even so, there is no single credit card that is universally accepted, and it is not foreseeable that any single issuer of credit cards, such as American Express, Visa, Master Charge, etc., is ever likely to become totally dominant or universally accepted.

Moreover, there are now available and in general use not only credit cards but also debit cards and various other financial-transaction cards, plus data cards and forms, often not machine-readable, for drivers' licenses, building security, insurance purposes, personal identification, etc.

Within a given data card category, there may be magnetic-stripe cards and so-called "smart" cards. The magnetic-stripe cards, which are in general use, have limited capabilities. The smart cards are not yet in such wide use but show great promise because of their superior capabilities. The two types of cards require different types of readers. Smart cards are in fact of at least two types: those employing electrical contacts and the so-called "contactless" smart cards. The latter are read in an A.T.M. or point-of-sale terminal by means of a field; no electrical contacts are required for reading the card.

There is a great need, which has not heretofore been met, for a substitute, replacement, or consolidation card allowing multiple card issuers to be represented within a single data card and allowing consumers to carry just one card for all types of transactions, including those listed above and others.

There is also a need to enable vendors individually or collectively to award points for frequency use and to track the awards efficiently. The current system of awarding airline bonus mileage, for example, is cumbersome, requiring a passenger to verbally advise a ticket agent of his frequent-flyer number at the time of ticketing and requiring the airline to prepare periodic reports to advise the passenger of the current status of his bonus account.

There is also a need to eliminate the cumbersome and annoying coupon system employed by supermarkets and similar stores. Consumers object to being made to clip coupons, often provided in the store or in newspapers, in order to obtain discounts. It would be very desirable to substitute a system that automatically kept track of purchases and awarded discounts or coupon equivalents automatically depending upon current purchases and/or history of purchases, broken down by brand and in other ways.

Clearly, the promise of the so-called cashless society has been delayed because of the lack of a suitable means for implementing it.

OBJECTS AND SUMMARY OF THE INVENTION

An object of the invention is to remedy the problems of the prior art outlined above. In particular, an object of the invention is to provide a multi-application data card capable of substituting for a plurality of (indeed all) existing single-application data cards, whether or not they are co-branded.

Another object of the invention is to provide a system comprising at least one multi-application data card and at least one card reader constructed so that a single data card can be substituted for a plurality of existing single-application data cards.

Another object of the invention is to provide a process employing at least one multi-application data card and at least one card reader and comprising steps that enable a multi-application data card to be substituted for a plurality of existing single-application data cards.

Another object of the invention is to provide a single type of data card that can be carried by everyone, so that everyone need carry one card and one card only.

The foregoing and other objects are attained in accordance with the invention by providing a smart card for recording data relating to a card user and a plurality card issuers and, associated with each issuer, the following fields: an application code field indicating a type of application made available to the user by the issuer; a PIN field identifying the user; an access code field wherein the card issuer can have access to the fields associated with that issuer but not the fields associated with any other issuer; an account number field; an expiration date field; and a miscellaneous data field provided for the issuer to record additional data to facilitate its operations with respect to the user; wherein the fields associated with each issuer are separate from the fields associated with every other issuer.

BRIEF DESCRIPTION OF THE DRAWINGS

A better understanding of the objects features and advantages of the invention can be gained from a consideration of the following detailed description of the preferred embodiments thereof, wherein:

FIG. 4 is a representation of an application record alternative to that of FIG. 1.

DESCRIPTION OF THE PREFERRED EMBODIMENTS

Figure 1:
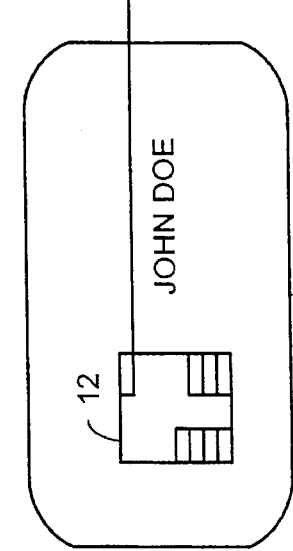
FIG. 1 is a schematic diagram of a multi-application data card of the smart-card type illustrating financial and other records contained thereon.

FIG. 1 shows a multi-application data card 10 conveniently formed of plastic and containing solid-state circuitry represented schematically at 12 and the name of the authorized card holder. The card 10 is a smart card, and the solid-state circuitry 12 includes a microprocessor and memory chips embedded within the card. The memory chips hold the equivalent of several typewritten pages of information. An example of some of the data recorded on the card is shown in FIG. 1. Thus a number of applications, including American Express, Visa, Master Charge, Discovery, various oil companies, various hotels, and various airlines, may be recorded together with a PIN (personal identification number), the account number, expiration date, account (or access or vendor) code, and various records for each of the separate accounts, plus miscellaneous data. The account, access or vendor code is a special code of each vendor which lets that vendor alone change data on the vendor's portion of the card. The records column includes, for example, frequency data, bonus point tie-ins with multiple vendors, etc. The miscellaneous column is for whatever additional data a particular vendor may wish to record.

In FIG. 1, the card 10 may have information printed or embossed on its face in addition to the name of the card holder. For example, this information may include the address and possibly other information such as the social security number and telephone number of the card holder. The same information can alternatively or additionally be provided in a memory chip embedded in the card 10. This information is available to all: the card holder herself, of course, as well as any vendor to whom the card is presented. Thus this information, without access to the additional information represented in FIG. 1, is sufficient for many purposes, such as awarding coupons to consumers who indicate certain preferences via interactive T.V.

Figure 2B:
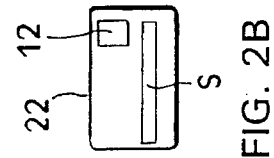
FIG. 2B is a representation of the reverse side of a card in accordance with the invention showing a space for the signature of the card holder.
Figure 2A:
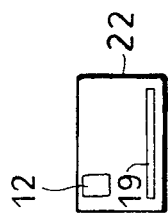
FIG. 2A is a representation of a card in accordance with the invention that is constructed as both a smart card and a magnetic-stripe card.

As FIG. 2A shows, it is possible to combine the smart card 10 and magnetic-stripe card 18 into a single multi-application card 22 having a magnetic stripe 19 for reading by a card reader compatible with a magnetic-stripe card and solid-state circuitry 12 for reading by a card reader compatible with a smart card. FIG. 2B shows the reverse side of the card shown in FIG. 2A, including a signature space S.

Other examples, which need not be illustrated in the drawing, include duty-free shops, cruise lines, traveller's checks, ticketing, T.V. cable/satellite box (interactive), health care, telephone, foreign currency applications, vending machines, keys, driver's license, insurance data, passport, voice, fingerprint, signature and supermarkets. Not only credit transactions but also debit transactions and non-financial transactions are within the scope of the invention.

In any case, the card reader includes first data port means enabling the holder of the card to select a particular application such as American Express, Visa, etc. The first data port means includes for example a keypad 24 by which the holder of the card selects the desired application.

In accordance with the invention, at least three memory banks are formed for storing and updating data relating respectively to at least one authorized holder of the card and at least two authorized applications of the card. If the card is a smart card, the memory is located at least in part on the card. On the other hand, if the card is a magnetic-stripe card, the memory is located at least in part remotely from the reader and connected thereto by a data link.

Figure 3:
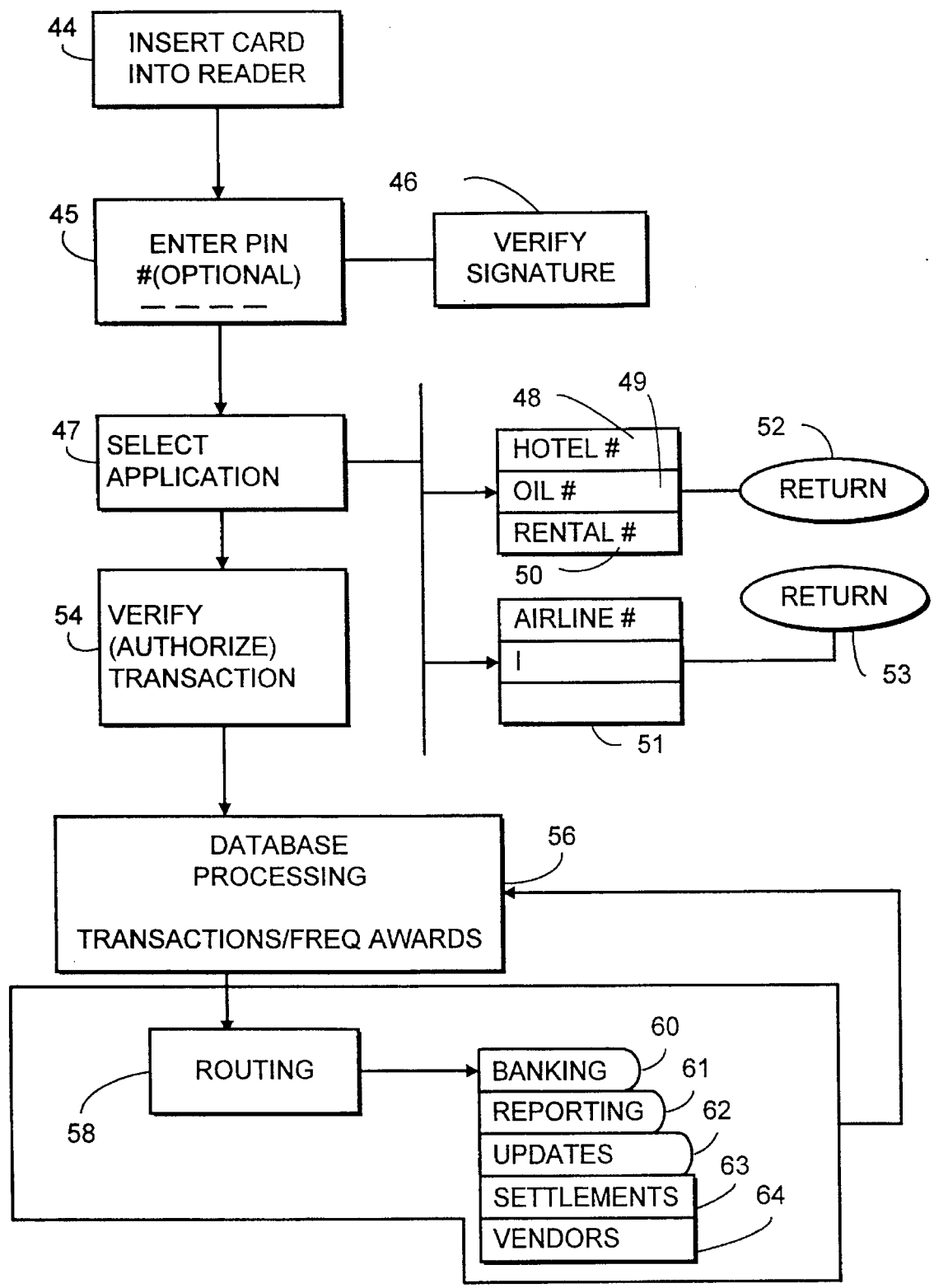
FIG. 3 is a high-level multiple card system flowchart or software diagram.

FIG. 3 explains the operation of the system in greater detail. The card is inserted into the reader at 44, and a personal identification number or PIN number is optionally entered at 45. A signature (or voiceprint, etc.) can optionally be verified at 46. At step 47, the desired application is selected using the input device (keypad, trackball, etc.) provided on the reader. The application can be a particular hotel, oil company, rental company, or airline as indicated at 48, 49, 50 and 51, or a combination of them. When the desired application has (or applications have) been selected, it is (they are) entered by pressing a return key 52 or 53 or in any other convenient manner, as those skilled in the art will readily understand.

The transaction is verified or authorized at 54, and the data base processing is performed at 56. This processing includes recording and updating of transactions, the calculation and storing of frequency awards such as frequent-flyer mileage, quantity discounts, and any other processing that may be called for in view of the selected application and the nature of the transaction.

Routing circuitry 58 routes the processed data to appropriate locations relating to banking, reporting, updates, settlements, vendors, etc., as indicated schematically at 60, 61, 62, 63 and 64. Updated data from these various locations are supplied back to the data processing circuitry 56 and if appropriate to the card reader for updating data stored on the holder's card.

In case of use of a card constructed in accordance with the invention as a credit card, there can be a predetermined credit card company that is specified by default unless the user specifies a different company. Similar defaults can be provided with respect to other choices offered the holder of the card.

It is also possible in accordance with the invention for one company, such as American Express, to issue a card and to rent space on the card to another company, such as Visa, and/or to make a transaction charge for use of the card to execute a transaction with that other company.

A card in accordance with the invention never needs to be reissued; for example, the expiration date for each separate application can be updated from time to time as the card is used, and the card holder can use the same card for a lifetime.

Preferably, a smart card is employed in accordance with the invention. A smart card can have higher transaction limits without the need to utilize data links because a smart card offers better security. It thus enables transactions to be pre-approved. The smart card can from another standpoint be self-authenticating; the system can be constructed so that, as to certain transactions, there is no need to obtain clearance at a central location. Avoidance of the use of data links saves money and time. The improved security provided by a smart card used in accordance with the invention will reduce fraud and provide issuer savings.

When the card is used as a frequency card, tie-ins, for example between American Express, Hyatt Hotels, United Airlines and Hertz, can easily be made.

The card is suitable for both business and personal use. If airline mileage is tracked, for example, and bonus mileage is awarded, it can be used instantaneously if recorded on the card, simply by presenting the card to a card reader and entering the appropriate instructions. This reduces the expense of mailings every time a transaction occurs.

The card can be used in one of its applications as a cash card with a stored cash value, thereby avoiding the need to purchase traveler's checks. This can be done in multiple currencies, thus saving travellers from carrying multiple foreign currencies.

The card in any of its applications can be encrypted for security, using any conventional or unconventional encryption system.

Digitally encrypted sound and video signals can be recorded on the card, providing for both sound and a visual display in association with a suitable terminal, as those skilled in the art will readily understand.

The card can interact with a computer (P.C., laptop, palmtop, pocket, etc.), with "Personal Computer Memory Card" slots to provide calendar, date book and checkbook information. With an adaptor, smart cards can be used in the PCMC slot and be read from and written to. The card user can then use a computer to access the data on the card (and modify certain data). If the computer has a modem, it becomes a terminal whereby transactions can be made. In addition, there are telephones with reading and writing functions that can be adapted for use in accordance with the invention. Other devices that can perform reading and writing functions can also be employed.

The card can be used for mass transit, since it can have a stored value that is debited with each use.

There is no limit to the data relating to the holder that can be provided on the card, except whatever limit is imposed by memory capacity. For example, these data can be selected from the group consisting of medical records of said holder; insurance records of said holder; a driver's license of said holder; a passport of said holder; financial records of said holder; a digitized fingerprint of said holder; a digitized voiceprint of said holder; a security code of said holder; and commercial-bonus points of said holder.

Similarly, there is no limit on the data relating to the applications, except the limit imposed by the memory capacity of the card. For example, these data can be selected from the group consisting of a prepaid transaction of the holder; a credit transaction of the holder; a debit transaction of the holder; an electronic funds transfer of the holder; a healthcare transaction of the holder; an insurance transaction of the holder; a commercial-bonus-points transaction of the holder; an airline ticketing transaction of the holder; a train ticketing transaction of the holder; a bus ticketing transaction of the holder; a ship ticketing transaction of the holder; and a theater ticketing transaction of the holder.

FIG. 4 shows another example of a typical application record. It is optionally alternative to the record illustrated in FIG. 1, or features of FIGS. 1 and 4 can be combined in a single system. FIG. 4 is arranged in seven columns, with respective headings "Card Issuer," "Application Code," "PIN Number," "Vendor Access Code," "Account Number," "Expiration Date," and "Miscellaneous Data."

The "Card Issuer" column includes, by way of example, AMEX, KFC, Any Card, VISA (debit), VISA (credit), etc.

The "Application Code" column indicates by way of example the following respective applications: credit, debit, prepaid, bonus award, etc. These applications and others are explored in greater detail below.

The third column gives as an example of a PIN number a four-digit number personal to the user of the card. The PIN number of course does not appear on the face of the card and is known only to the authorized card user and the card issuer. The user keys it in at the time of use. This is a safeguard against unauthorized use. The PIN number is shown as being the same for all applications, which the user may find convenient, but can of course be different for the several applications. The use of different PIN numbers for different applications might enable a user to lend the card (to an employee, for example) for certain purposes (purchase of gasoline for a company car, for example) while denying the person to whom the card is lent the use of the card for making general purchases.

The fourth column relates to a Vendor Access Code. This is a code whereby each vendor or other card issuer can have access to the parts of the record required for the transactions facilitated by that vendor (issuer) while denying to other vendors (issuers) and third parties generally access to certain confidential parts of the record.

The fifth column is for the Account Number. The Account Number assigned by a particular vendor or other card issuer will of course be different for each user and can optionally be different for each application of the same user. For example, VISA might employ a different account number for debit transactions than it employs for credit transactions by the same card user. Alternatively, VISA might elect to employ the same account number for both types of transactions made by the same user.

The sixth column gives the expiration date of the card (e.g., May 1996). As noted above, this date as well as other information on the card can be changed electronically without the necessity of issuing a new card. Thus a single card can in principle serve a given user for a lifetime.

The seventh column is for Miscellaneous Data and is reserved for each vendor or other card issuer to record whatever additional data that vendor may require to facilitate its operations.

Figure 5:
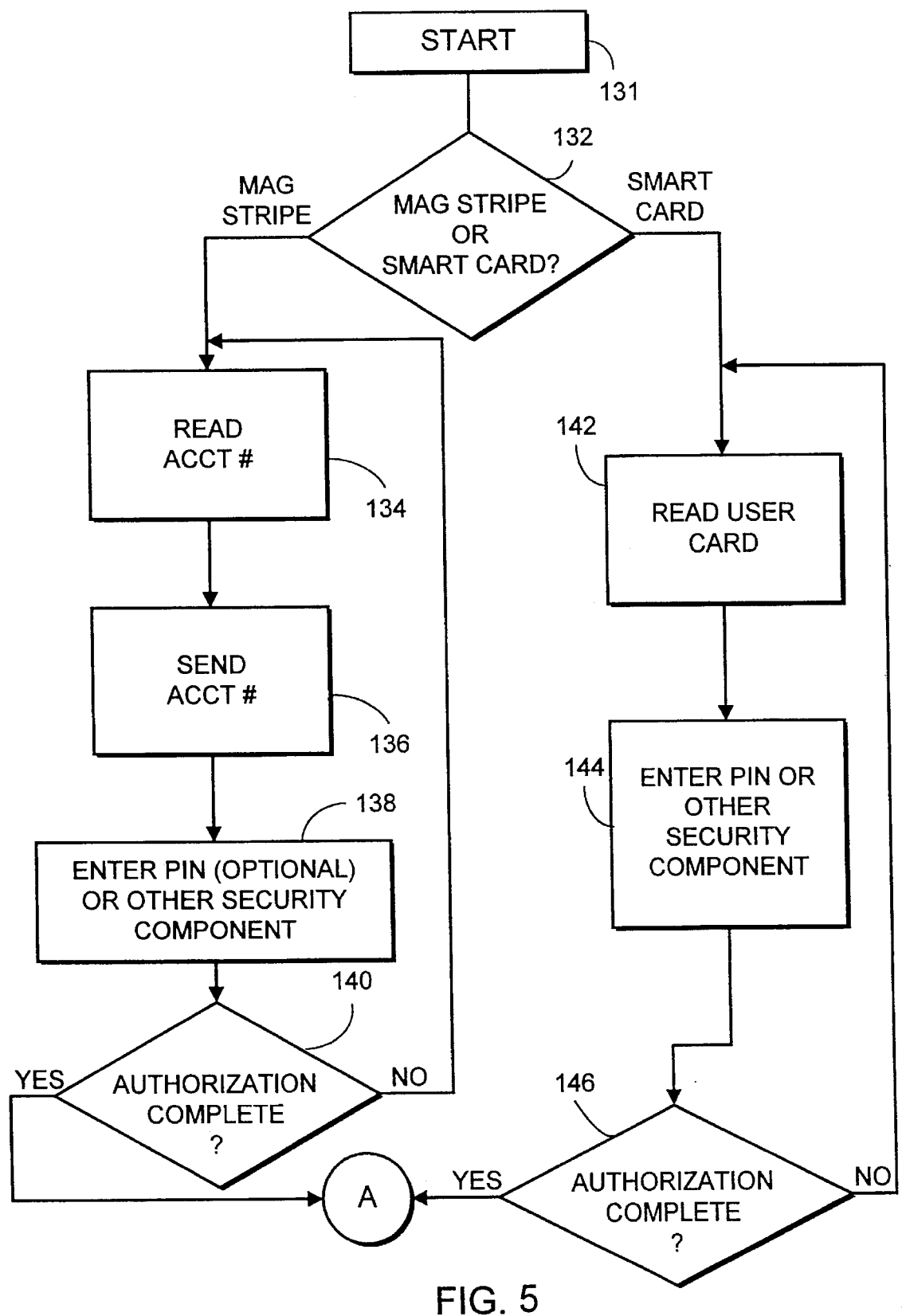
FIGS. 5–9 form a single flowchart, the several sheets being interrelated as indicated by letters designating jumps, showing an example of the use of a multi-application smart card or magnetic stripe card in accordance with the invention in various operations.

FIG. 5 shows at 131 the start of a software routine for reading a magnetic stripe card or a smart card. At step 132, a determination is made whether the presented card is a magnetic stripe card or a smart card.

If at step 132 it is determined that the card presented is a magnetic stripe card, then at step 134 the account number is read and at step 136 the account number is sent to a remote location. At step 138, a pin number is entered or another security precaution such as verification of a digitally encoded signature is taken.

At step 140 a determination is made whether authorization is complete. If not, the program loops back to step 134. If at step 140 it is determined that authorization is complete, the program proceeds to FIG. 6, described below.

If at step 132 it is determined that the card presented is a smart card, then at step 142 the card is read. At step 144, a PIN number is optionally entered, or another security step such as verification of a digitally encoded signature is taken.

At step 146, a determination is made whether authorization is complete. If not, the program loops back to step 142.

Figure 6A:
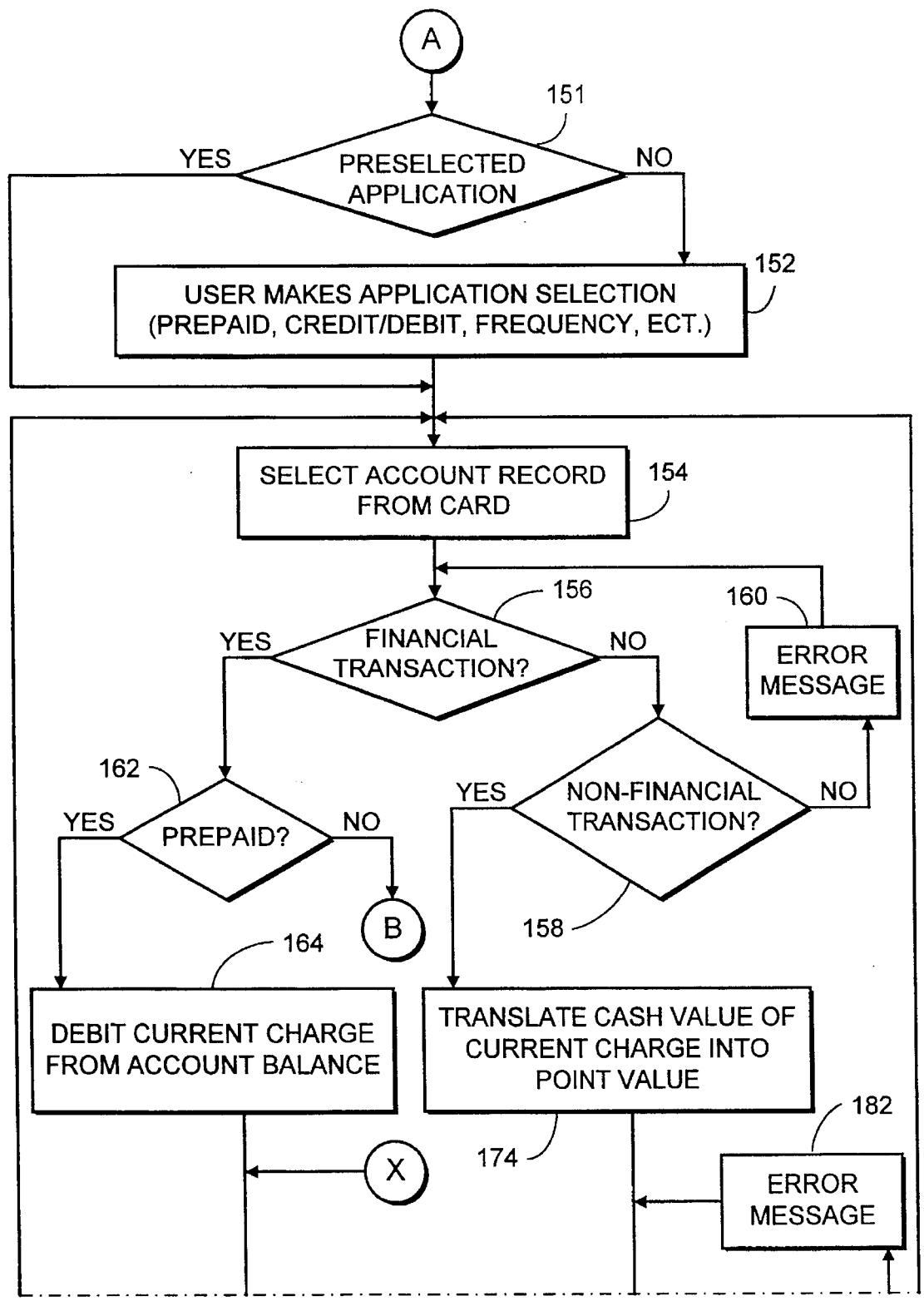
Figure 6B:
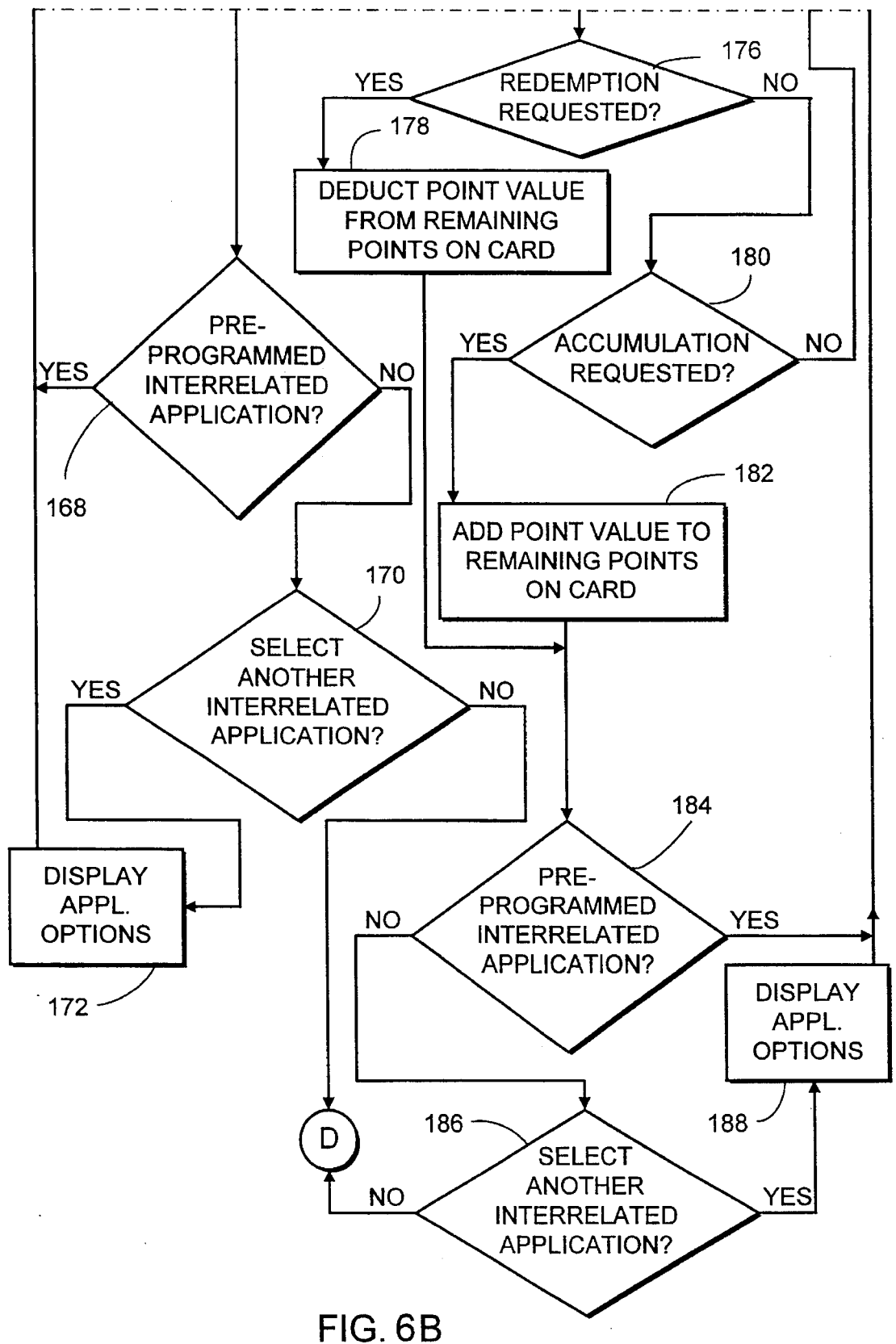

If it is determined at step 146 that authorization is complete, the program proceeds to FIG. 6.

At step 151 in FIG. 6, a determination is made whether there is a preselected application. If not, at step 152 the user of the card makes an application selection such as a prepaid transaction, a credit transaction, a debit transaction, or a frequency-of-use transaction. Following a determination at step 151 that there is a preselected application or following the selection made by the user at step 152, the program selects the account record from the card at step 154.

At step 156, a determination is made whether the requested transaction is financial. If not, then at step 158 a determination is made whether the requested transaction is nonfinancial. If a determination is made at step 156 that the transaction is not financial and at step 158 that it is not nonfinancial, then at step 260 an error message is generated, and the program loops back to step 156.

Figure 7:
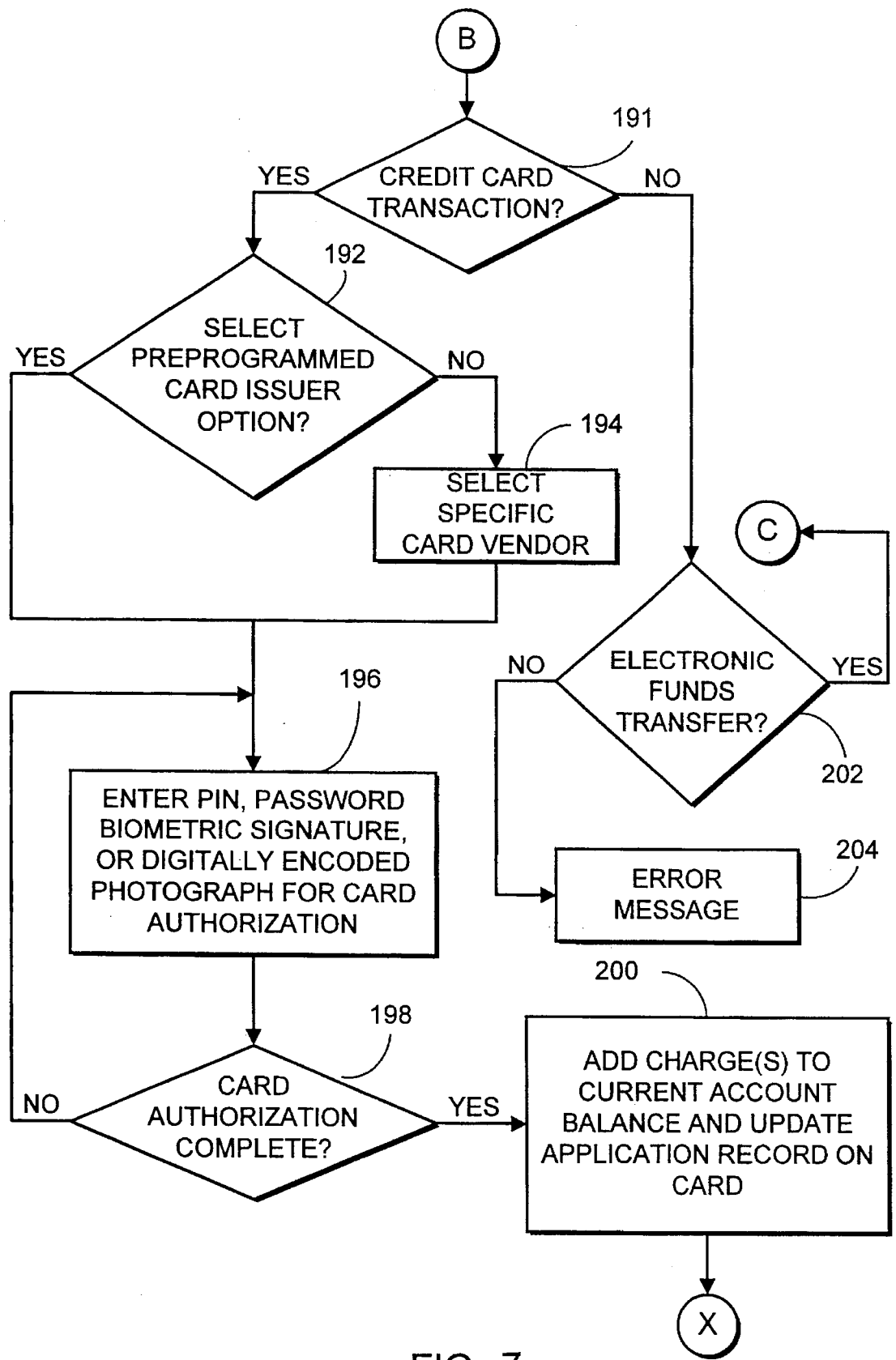

If at step 156 a determination is made that the requested transaction is financial, then at step 162 it is determined whether the financial transaction is prepaid. If so, then the current charge is debited from the account balance at step 164. If it is determined at step 162 that the requested financial transaction is not prepaid, in the program proceeds to FIG. 7, described below.

Following the debiting of the current charge from the account balance at step 164, a determination is made at step 168 whether there is a preprogrammed interrelated application. If so, the program loops back to step 154. Otherwise, a determination is made at step 170 whether the user intends to select another interrelated application. If so, the other application options are displayed at step 172, and the program loops back to step 154. If another interrelated application is not to be selected, as determined at step 170, the program proceeds to FIG. 9, described below.

If at step 158 the transaction is determined to be nonfinancial, then at step 174 the cash value of the current charge is translated into a point value. Then, at step 176 it is determined whether a redemption of accumulated points is requested. If so, at step 178 the appropriate point value is deducted from the remaining points on the card. If it is determined at step 176 that redemption is not requested, a determination is made at step 180 whether an accumulation is requested. If not, an error message is generated at step 182, since it is understood that either a redemption or an accumulation will be requested, and the program loops back to step 176.

If it is determined at step 180 that an accumulation is requested, the incremental point value is added to the points previously accumulated on the card at step 182. At step 184, a determination is made whether there is a preprogrammed interrelated application. If so, the program loops back to step 154. Otherwise, a determination is made at step 186 whether the user wishes to select another interrelated application. If so, the other application options are displayed at step 188, and the program loops back to step 154. If the user does not wish to select another interrelated application, as determined at step 186, the program proceeds to FIG. 9, described below.

If it is determined at step 156 that the requested transaction is financial and at step 162 that it is not prepaid, then a determination is made at step 191 (FIG. 7) whether the transaction is a credit card transaction. If so, a determination is made at step 192 whether a preprogrammed card issuer option is selected. If no preprogrammed card issuer option is selected, a specific card vendor is selected at step 194.

Following the selection of a specific card vendor at step 194 or a determination that a preprogrammed card issuer option is selected at step 192, a PIN, password, biometric signature, or digitally encoded program for card authorization is entered at step 196. At step 198, a determination is made whether card authorization is complete. If not, the program loops back to step 196. When card authorization is determined at step 198 to be complete, the appropriate charge is added to the current account balance, and the application record on the card is updated at step 200. The program then loops back to step 168 in FIG. 6.

If a determination is made at step 191 (FIG. 7) that the transaction is not a credit card transaction then a determination is made at step 202 whether the transaction involves electronic funds transfer. If not, an error message is generated at step 204, since the transaction is not within the universe of available possibilities.

Figure 8:
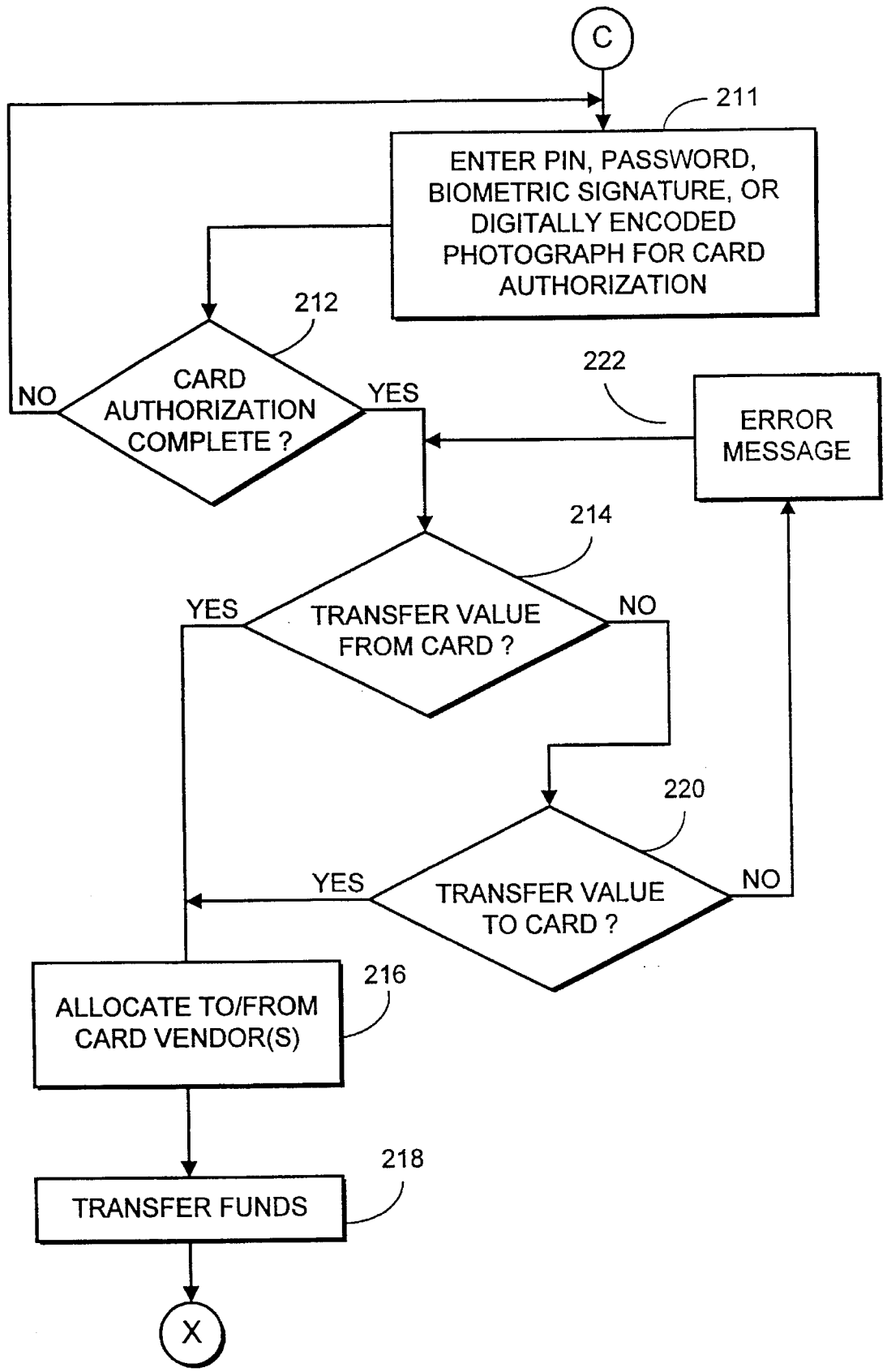

If at step 202 it is determined that the transaction is for electronic funds transfer, then the program proceeds to FIG. 8.

At step 211, a PIN, password, biometric signature, or digitally encoded photograph for card authorization is entered. At step 212, a determination is made whether card authorization is complete. If not, the program loops back to step 211. If it is determined at step 212 that card authorization is complete, then at step 214 a determination is made whether the value is to be transferred from the card. If so, the value is transferred from the card at step 216, and a transfer of the funds is effected at step 218.

If it is determined at step 214 that the value is not to be transferred from the card, then a determination is made at step 220 whether the value is to be transferred to the card. If so, the value is transferred to the card at step 216, and the transfer of funds is effected at step 218.

If it is determined at steps 214 and 220 that the value is to be transferred neither from the card nor to the card, an error message is generated and displayed at step 222, and the program loops back to step 214.

Following the transfer of funds at step 218, the program loops back to step 168 in FIG. 6.

Figure 9:
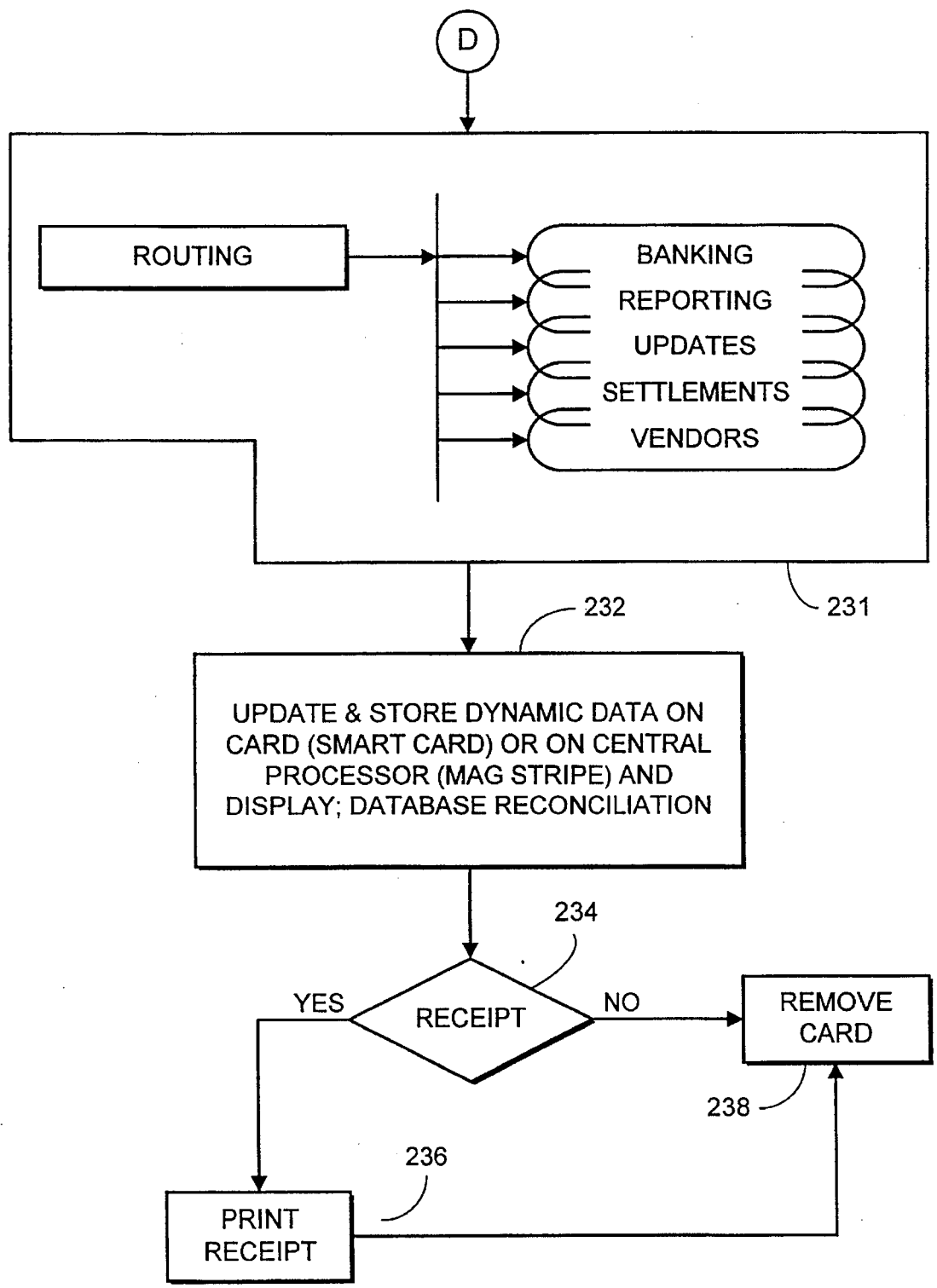

Whenever it is determined at step 170 or 186 that another interrelated application is not selected (FIG. 6), the program proceeds to FIG. 9. There, the appropriate routing takes place at step 231. This includes updating and forwarding information relating to banking, reporting, updates, settlements, and vendors. At step 232, dynamic data is updated and stored on the card (if a smart card) or at a central processing station (if the card is a magnetic stripe card). The appropriate information is displayed to the card user, and database reconciliation is effected. Those having ordinary skill in the art will understand how to accomplish these functions.

The user of the card is given an opportunity to request a receipt. At step 234 a determination is made whether a receipt has been requested. If so, it is printed at step 236. In either case, the user removes the card at step 238.

Thus there is provided in accordance with the invention a novel and highly effective multi-application data card capable of substituting for a plurality of existing single-application data cards, a system in which the card can be employed and applications prioritized, and a process of employing the card.

Many modifications and extensions of the preferred embodiments of the invention disclosed above will readily occur to those skilled in the art. Accordingly, the invention is to be construed as including all embodiments thereof that fall within the scope of the appended claims.

I claim:

1. A smart card for recording data relating to a card user and a plurality of card issuers and, associated with each issuer, the following fields:

an application code field indicating a type of application made available to the user by the issuer;

a PIN field identifying the user;

an access code field wherein the card issuer can have access to the fields associated with that issuer but not to fields associated with any other issuer;

an account number field;

an expiration date field; and a miscellaneous data field provided for the issuer to record additional data to facilitate its operations with respect to the user;

wherein the fields associated with each issuer are separate from the fields associated with every other issuer.

2. A smart card according to claim 1 wherein the types of applications include financial transactions.

3. A smart card according to claim 1 wherein the types of applications include nonfinancial transactions.

4. A smart card according to claim 1 wherein the types of applications are selected from the group consisting of credit transactions, debit transactions, prepaid transactions and bonus award transactions.

* * * * *